United States Patent

Hafner et al.

[19]

[11] Patent Number: 6,065,295

[45] Date of Patent: May 23, 2000

[54] LOW-TEMPERATURE REFRIGERATOR WITH COLD HEAD AND A PROCESS FOR OPTIMIZING SAID COLD HEAD FOR A DESIRED TEMPERATURE RANGE

[75] Inventors: Hans-Ulrich Hafner, Cologne; Dieter Sous, Erftstadt, both of Germany

[73] Assignee: Leybold Vakuum GmbH, Germany

[21] Appl. No.: 09/077,345

[22] PCT Filed: Dec. 10, 1996

[86] PCT No.: PCT/EP96/05503

§ 371 Date: May 20, 1998

§ 102(e) Date: May 20, 1998

[87] PCT Pub. No.: WO97/22839

PCT Pub. Date: Jun. 26, 1997

[30] Foreign Application Priority Data

Dec. 15, 1995 [DE] Germany .......................... 195 47 030

[51] Int. Cl.[7] .................................................. F25B 9/00
[52] U.S. Cl. .................... 62/6; 60/520; 165/4; 165/10
[58] Field of Search .......................... 62/6; 60/520; 165/4, 165/10

[56] References Cited

U.S. PATENT DOCUMENTS

| | | |
|---|---|---|
| 2,966,035 | 12/1960 | Gifford . |
| 3,218,815 | 11/1965 | Chellis et al. . |
| 3,221,509 | 12/1965 | Garwin . |
| 3,292,501 | 12/1966 | Verbeek ........................................ 62/6 |
| 3,397,738 | 8/1968 | Daunt ............................................ 62/6 |
| 3,445,910 | 5/1969 | Duryee et al. ................................ 62/6 |
| 3,473,341 | 10/1969 | Mulder . |
| 3,794,110 | 2/1974 | Sevverijns ..................................... 62/6 |
| 4,310,337 | 1/1982 | Sarcia . |
| 4,385,499 | 5/1983 | Lam ............................................. 62/6 |
| 4,404,808 | 9/1983 | Andeen . |
| 4,510,771 | 4/1985 | Matsuda et al. . |
| 4,543,792 | 10/1985 | Bertsch . |
| 4,689,970 | 9/1987 | Ohguma et al. . |
| 4,724,676 | 2/1988 | Lewis . |
| 5,092,130 | 3/1992 | Nagao . |
| 5,113,663 | 5/1992 | Gifford . |

FOREIGN PATENT DOCUMENTS

| | | |
|---|---|---|
| 0437661 | 1/1982 | European Pat. Off. . |
| 2525331 | 9/1983 | France . |
| 2 525 331 | 10/1983 | France . |
| F 25 B 9/00 | 11/1981 | Germany . |
| F 04 B 37/08 | 3/1984 | Germany . |
| 83 32 868 U | 5/1984 | Germany . |
| 8332868 | 5/1984 | Germany . |
| F 25 B 9/14 | 7/1985 | Germany . |
| F 04 B 37/08 | 10/1986 | Germany . |
| F 04 B 37/08 | 9/1991 | Germany . |
| F 04 B 37/08 | 4/1995 | Germany . |
| 4401246 | 7/1995 | Germany . |
| F 25 B 9/14 | 7/1995 | Germany . |
| 1324502 | 7/1973 | United Kingdom . |
| 0 437 661 A1 | 1/1990 | United Kingdom . |

*Primary Examiner*—Ronald Capossela
*Attorney, Agent, or Firm*—Wall Marjama Bilinski & Burr

[57] ABSTRACT

The invention relates to a low-temperature refrigerator (1) for producing temperatures in a defined low-temperature range, with a cold head (3) which is fitted with a regenerator (6)[6)] and in which a thermodynamic circulation process (regenerative cold generation process) is carried out to generate cold. To reduce the technical complexity of the cold generation process, it is proposed that the cold head (3) should be a single-stage unit and the physical characteristics of the regenerator (6)[7)] in the cold machine (1) should be so selected as to ensure that the cold head (3)[8)] has an optimal cold output in the desired temperature range. (drawing FIG. 2)

[6)] Translator's note: The German text states "7" here whereas "6" would be more in line with the remaining text and the drawing figures. Therefore "6" has been assumed for the translation.
[7)] Translator's note: The German text states "7" here whereas "6" would be more in line with the remaining text and the drawing figures. Therefore "6" has been assumed for the translation.
[8)] Translator's note: The German text states "26" here whereas "3" would be more in line with the remaining text and the drawing figures. Therefore "3" has been assumed for the translation.

17 Claims, 4 Drawing Sheets

LOW-TEMPERATURE REFRIGERATOR WITH COLD HEAD AND A PROCESS FOR OPTIMIZING SAID COLD HEAD FOR A DESIRED TEMPERATURE RANGE

BACKGROUND OF THE INVENTION

The invention relates to a low-temperature refrigerator for producing temperatures in a defined low-temperature range, with a cold head which is fitted with a regenerator and in which a thermodynamic circulation process (regenerative cold generation process) is carried out to generate cold. Moreover, the present invention relates to a process for optimising said cold head for a desired temperature range as well as applications.

It is known to employ low-temperature refrigerators in connection with cryogenic pumps or the cooling of magnets in nuclear spin tomographs. In these applications the cold head shall generate temperatures in the range of 20 K or below. Commonly therefore, refrigerators designed to have two or three stages operating according to the Gifford-McMahon[1] principle, for example, are employed in these applications. However, at these low temperatures the refrigerating capacity of these machines is limited. In commercially available two-stage cold heads, the refrigerating capacity amounts to about 5 to 10 W at a temperature of 20 K. If the refrigerating capacity Translator's note: The German text reads "Giffon-McMahon" where "Gifford-McMahon" would be appropriate and in line with the remaining text as well as other publications on this topic. Thus the word "Gifford-McMahon" has been assumed for the translation. requirement is higher, several two-stage cold heads must be employed in order to attain the corresponding refrigerating capacity through the total.

SUMMARY OF THE INVENTION

It is the task of the present invention to reduce the technical complexity of generating low temperatures, and moreover, to apply a relatively simple means in order to make the cold head for a refrigerator of the aforementioned kind particularly suitable for a certain temperature range.

This task is solved by the present invention in that the cold head is designed to be of the single-stage type, and that the physical characteristics of the refrigerating machine's regenerator are so selected that the cold head delivers an optimal refrigerating capacity within the desired temperature range. Alone by employing a single-stage refrigerating machine, the technical complexity is already reduced significantly. Moreover, it has been determined that also single-stage refrigerating machines are capable of generating temperatures below 20 K. In this it has been found, surprisingly, that with cold heads which are equipped with suitably designed regenerators, much higher refrigerating capacities can be attained also in the temperature range around 20 K, as would be possible with the two-stage cold heads mentioned above. The root cause for this improvement in refrigerating capacity is, on the one hand, the special design of the regenerator. On the other hand, in two-stage cold heads a part of the refrigerating capacity is consumed for the first stage and it is thus not optimally utilised at low temperatures, so that the attained efficiency is in total poor. Therefore the realisation of the present invention thus permits—instead of the previously commonly used two-stage refrigerating machine for temperatures around 20 K—the deployment of a simple and thus reliable single-stage machine with the additional benefit of an increased refrigerating capacity.

Cold heads of the type designed according to the present invention are especially suited in applications, in which the target temperatures are slightly above 20 K. Through the selection of the properties of the regenerator material and corresponding layering of different materials, the cold head or the refrigerating machine may be optimised with respect to the desired temperature range.

An example for an application in which the employment of a cold head designed according to the present invention is particularly advantageous, is the cooling of high-temperature superconductors ($HT_c$ material) with transition temperatures $T_c$ above the temperature of liquid nitrogen, in particular in applications involving high currents or strong magnetic fields (magnets for the Tesla range, energy storage, MRI, current limiters and alike).

In order to utilise these strong currents/magnetic fields, cooling with $LN_2$ (77 K) will not suffice; the superconductor should be cooled down to at least $\frac{1}{3}T_c$ so as to allow at all correspondingly high current densities/magnetic fields. Subsequently a temperature range of about 20 to 25 K is to be targeted in this application. The refrigerating machines previously mostly usable in this temperature range are generally two-stage Gifford-McMahon (or Stirling) types, the actual target temperature of which is below 20 K (about 10 to 15 K). These temperatures are not required for high-temperature superconductors or not desired for reasons of total efficiency. Moreover, the mentioned two-stage machines—like already mentioned above—supply only a limited refrigerating capacity of about 5 to 10 W at 20 K. Compared to this, larger high-temperature superconducting components require refrigerating capacities of 20 to 25 W or more at about 22 to 25 K.

Previous conventional single-stage machines have an ultimate temperature (without refrigerating capacity) of about 25 to 27 K, which in turn is too high for cooling high-temperature superconductors. The desired range of 20 to 25 K of considerable refrigerating capacity is attained only through the improvements of the present invention. In contrast to the two-stage machine (utilisation as a 20 to 25 K cooler), the single-stage machine offers the additional advantage of not having a cold ($2^{nd}$ stage) seal (sensitive wearing part) and an on the whole more simple design, resulting in a higher degree of reliability and simplified maintenance compared to a two-stage machine.

BRIEF DESCRIPTION OF THE DRAWINGS

Further advantages and details of the present invention shall be explained by reference to the design examples presented in the drawing FIGS. 1 to 9. Shown are:

drawing FIG. 1 a representation of the principle of a low-temperature refrigerator, drawing FIGS. 2 and 3 each a displacer with a regenerator located within, drawing FIG. 4 refrigerating capacity characteristics drawing FIG. 5 the application of a cold head designed according to the present invention for cooling a magnet made of superconducting material, drawing FIGS. 6 and 7 applications of a cold head designed according to the present invention cooling a coil made of high-temperature superconducting material as well as drawing FIGS. 8 and 9 applications of a cold head designed according to the present invention in connection with cryogenic pumps.

DESCRIPTION OF THE INVENTION

Figure 1:
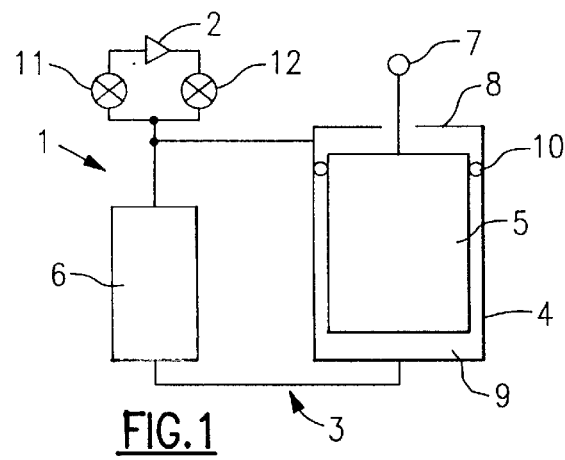

Presented schematically in drawing FIG. 1 is an example of a low-temperature refrigerator 1. This comprises the compressor 2 and the cold head 3. Essential components of the cold head 3 are a cylinder 4, a displacer 5 located within the cylinder and a regenerator 6. The displacer 5 is moved to and fro in the cylinder 4 by the drive 7 which may be either of the mechanical or pneumatic kind. Located above and below the displacer 5 are chambers 8 and 9 for the working gas. Placed in series with these chambers is regenerator 6, which in many designs of the gas cooling machines affected here, is located within the displacer 5. 10 designates a seal which in the case of the regenerator 6 being located within the displacer 5 ensures, among other things, that the working gas will be able to flow fully through the regenerator 6.

With the aid of compressor 2 and the valves 11, 12 the chambers 8, 9 are linked in suitable sequence to a high-pressure and a low-pressure line with working gas, so that the desired thermodynamic circulation process is performed. Thus heat is continuously withdrawn from one side of the cylinder 4 (expansion chamber 9). The regenerator 6 stores part of the generated cold and successively causes a pre-cooling of the gas which is shifted from chamber 8 to chamber 9, so that this side cools down to low temperatures.

This applies similarly also to refrigerating machines which operate according to the Pulse Tube Principle. In these, a mechanical displacer can be dispensed with, but the operation of the regenerator as a pre-cooler for the working gas which is to be expanded cyclically, is the same.

Figure 2:
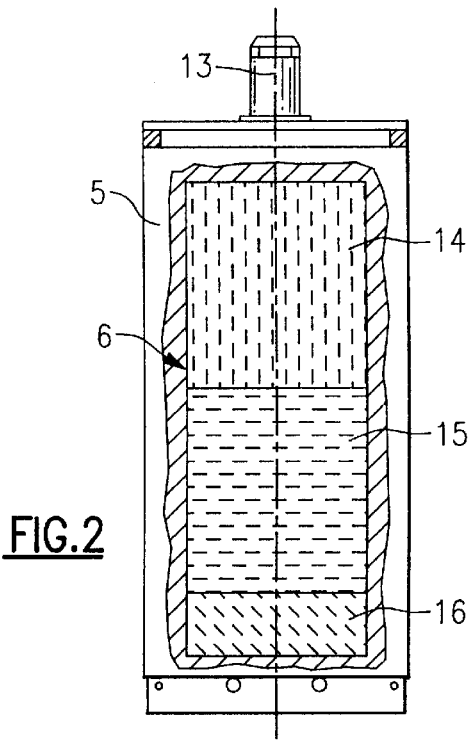
Figure 3:
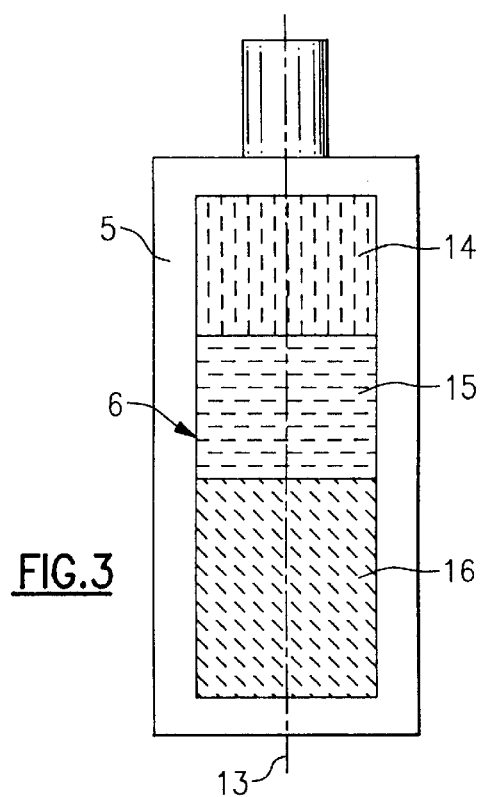

Drawing FIGS. 2 and 3 depict displacer 3 each with regenerator 6 located within. The longitudinal axis is designated by 13. They each comprise three layers or stages 14, 15 and 16 made of different regenerator materials.

In the displacer according to drawing FIG. 2, the layer 14 next to the warm side of the displacer is made of first package of bronze mesh sections extending perpendicular to the longitudinal axis. This layer extends over two- to three-sevenths of the regenerator's length. The second layer 15 consists of a package of bronze mesh sections of a different mesh, a smaller mesh for example. This layer too, extends over two- to three-sevenths of the regenerator's 6 length. Finally on the cold side of the displacer 3, there follows a layer 16 made of lead, preferably lead spheres. It extends over one- to two-sevenths of the regenerator's 6 length.

In a version implemented for the low-temperature range of 15 to 35 K the regenerator 6 is composed of the following layers (drawing FIG. 3):

| Layer 14: | |
| --- | --- |
| Material: | Copper-bronze |
| Structure: | Radially extending mesh of about 200 mesh |
| Height: | About 40% of the total length of regenerator 6 |
| Layer 15: | |
| Material: | Copper-bronze |
| Structure: | Radially extending mesh of about 120 mesh |
| Height: | About 40% of the total length of regenerator 6 |
| Layer 16: | |
| Material: | Lead spheres |
| Structure: | 200 to 300 $\mu$m in diameter |
| Height: | About 20% of the total length of regenerator 6 |

A cold head having a regenerator 6 equipped with these layers, and of a diameter of about 50 mm, is especially well suited for the temperature range of 15 to 35 K, 20 to 25 K in particular. Through varying the percentages (height of the layers 14, 15 16) of the individual layers of the regenerator, by selecting materials other than copper-bronze and lead as well as through their structure, the refrigerating capacity may be optimised in a defined manner for other temperature target ranges.

In a regenerator for the target range of 35 to 80 K, layer 16, for example, is not composed of lead spheres, but also of copper-bronze mesh of 80 to 200 mesh. Moreover, in the warm area (layer 14) it is advantageous to employ stainless steel mesh of 100 to 200 mesh.

Figure 4:
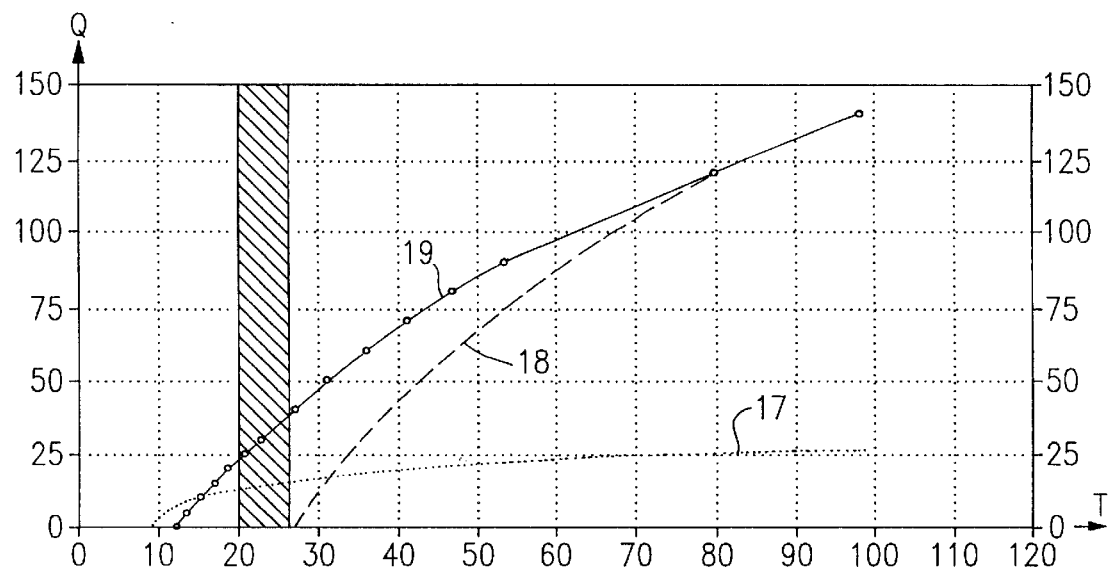

Shown in drawing FIG. 4 are three refrigerating capacity characteristics 17, 18, 19 in a single system of co-ordinates, in which the refrigerating capacity Q (y-axis) vs. temperature T (x-axis) has been entered. Line 17 represents the refrigerating capacity characteristic for the second stage of a common two-stage cold head. Line 18 represents the refrigerating capacity characteristic of a single-stage cold head according to the state-of-the-art. Line 19 corresponds to the refrigerating capacity characteristic of a cold head designed according to the present invention and optimised with respect to the temperature range of 20 to 25 K.

Figure 5:
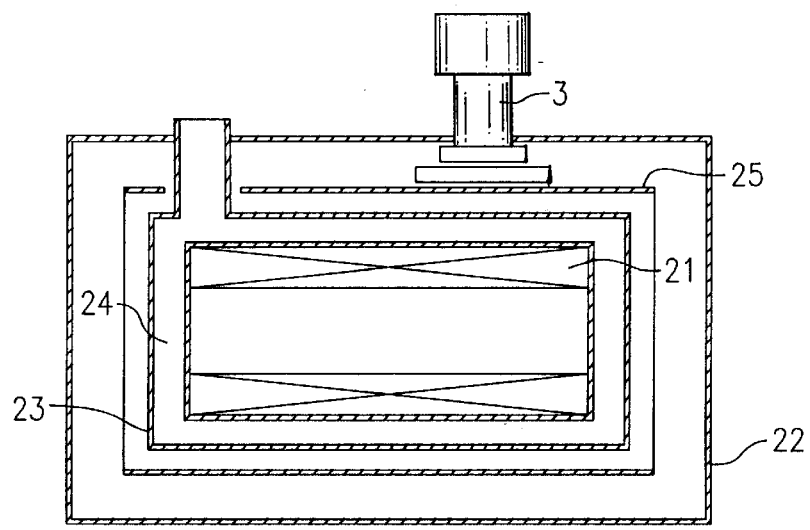
Figure 6:
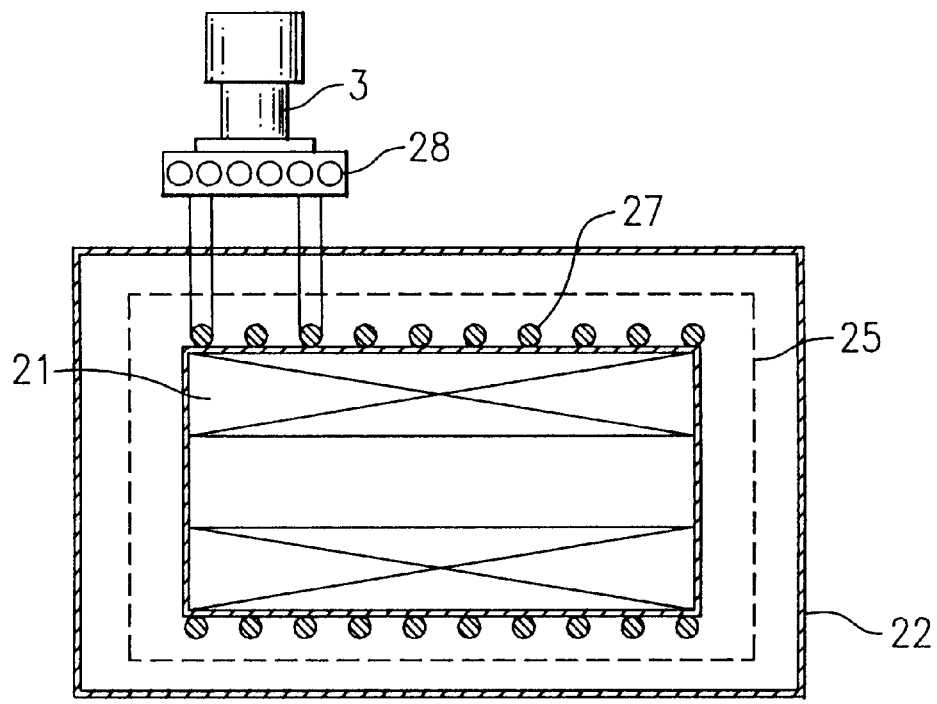
Figure 7:
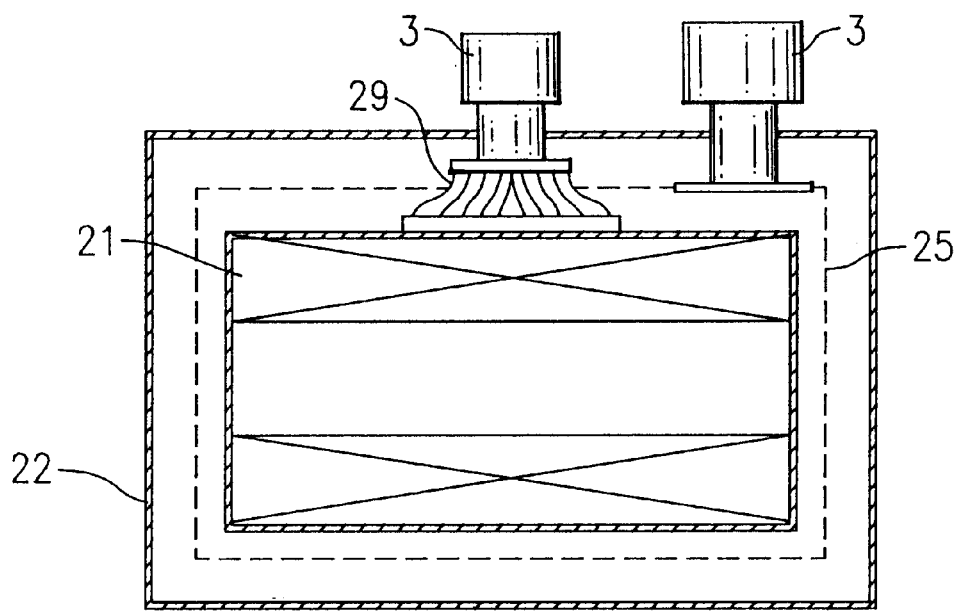

Drawing FIGS. 5 to 7 depict applications of the present invention in the cooling of superconducting magnets or coils 21, which are in each case located within casing 22. In the design example according to drawing FIG. 4, a superconducting magnet 21 is located in the hollow space of a double-walled vessel 23. Located in the space 24 formed by the walls, is liquid helium. In this case, the magnet 21 is made of classic (low-temperature) superconducting material which generally requires cooling down to 4 to 6 K and which therefore is placed in a bath of liquid helium. The vessel 23 is surrounded by a thermal radiation shield 25 which is cooled with the aid of a single-stage cold head 3 designed according to the present invention. The regenerator 6 located in the cold head 3 is preferably optimised with respect to the temperature range of 10 to 30 K.

In the design example according to drawing FIG. 6, the magnet 21 is surrounded by a cooling coil 27 being part of a circulating helium flow with heat exchanger 28. Cooling is performed with the aid of the single-stage cold head 3, which is preferably designed in the same way as in the design example according to drawing FIG. 4, and which cools the circulating gas to a temperature required for cooling the superconducting coil. If this coil is made of high-temperature superconducting wire, then the cold head is preferably optimised with respect to a temperature range of 20 to 25 K.

In the design example according to drawing FIG. 7, the single-stage cold head 3 is linked mechanically (via copper strips 29, for example) to the superconducting magnet 21—preferably made of high-temperature superconducting material—thereby establishing a thermally conducting link. In order to maintain the temperature of the shield 25, a further cold head 3 designed according to the present invention is provided, said cold head being optimised with respect to correspondingly higher temperature range (50 to 80 K, for example).

Figure 8:
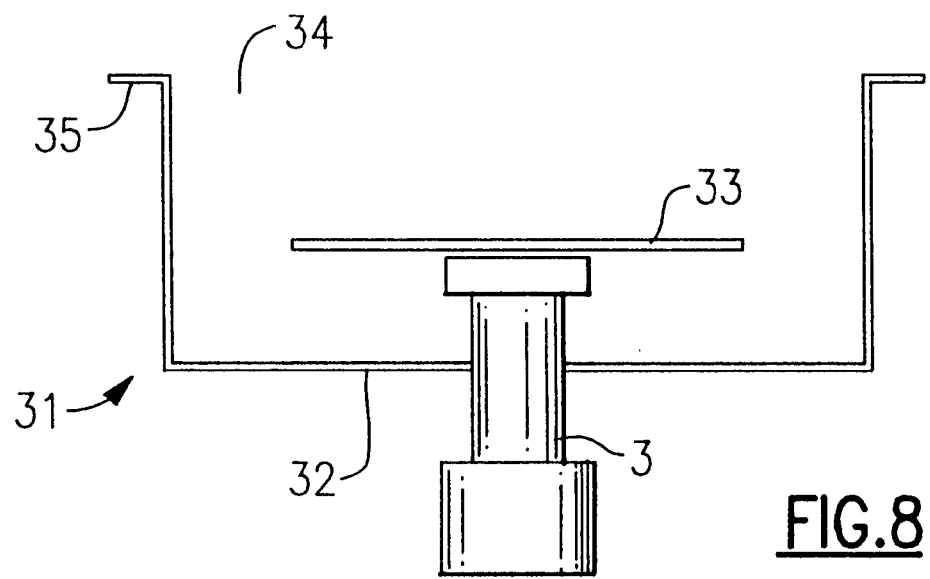
Figure 9:
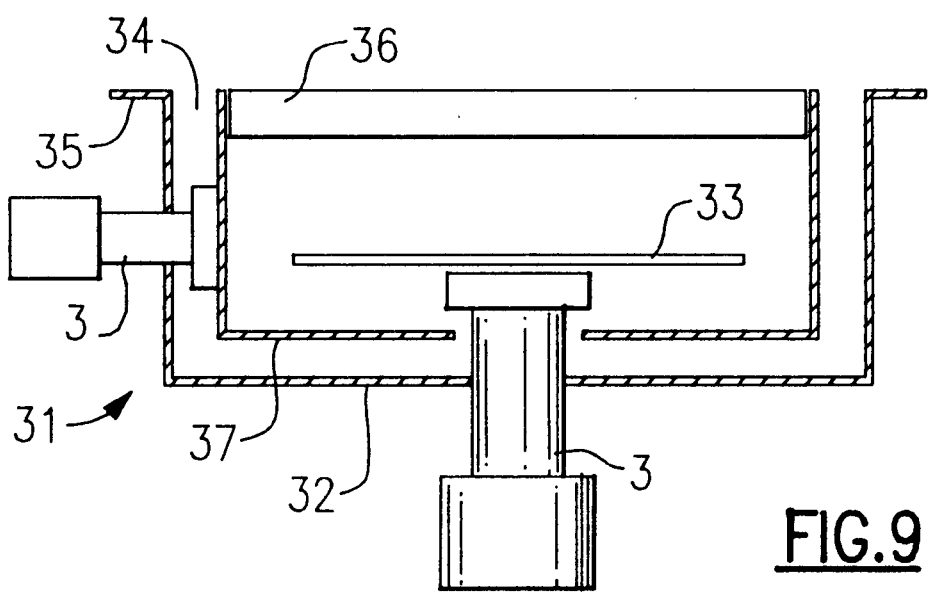

Finally, drawing FIGS. 8 and 9 depict the application of the cold heads 3 designed according to the present invention in connection with cryogenic pumps 31. These have a pot-shaped casing 32 each with a pumping surface 33 located therein. The open side of the casing 32 forms the pump's inlet 34, and is equipped with a flange 35 for connection to a vacuum chamber.

In the cryogenic pump 31 according to drawing FIG. 8, there is present an "open" condensation surface 33. The pumping surface 33 is thermally linked to the cold head 3 and extends in parallel to the plane of the inlet opening 34. "Open" means that a baffle in the pumps inlet 34 for shielding against thermal radiation is not present. This kind of design is previously only known from cryogenic pumps for water vapour. Due to the use of a cold head designed according to the present invention this kind of design may now also be employed in cryogenic pumps for gases which condense at lower temperatures, like nitrogen, argon or the like. Cold head 3 is optimised for such temperatures which are required for condensation of the gases. For nitrogen and argon, a temperature of about 20 K is required.; for xenon, cooling to 35 K will suffice. An optimisation to temperatures from the temperature range of 10 to 35 K is thus expedient in this kind of application.

In the cryogenic pump 31 according to drawing FIG. 9, a baffle 36 arranged in the pump's inlet 34 is present. It is thermally linked to a thermal radiation shield 37 embracing the pumping surface 33. For the purpose of cooling baffle 36 and shield 37, a second cold head 3 also of single-stage design is provided independently of the single-stage cold head 3 employed for cooling the pumping surface 33. Preferably the cold head assigned to pumping surface 33 is again optimised for temperatures in the range of 10 to 35 K, whereas the cold head 3 related to the thermal radiation shield 37 is optimised for temperatures of about 80 K.

A significant advantage of cryogenic pumps cooled with single-stage cold heads 3 is, that single-stage cold heads have, at higher temperatures, a significantly higher refrigerating capacity compared to two-stage cold heads (c.f. drawing FIG. 4). Cryogenic pumps with single-stage cold heads are thus especially suited for applications in which the cryogenic pump needs to be switched off frequently. The cooldown times which elapse until the operating temperature is attained, are significantly shorter in the case cryogenic pumps equipped with a single-stage cold heads.

What is claimed is:

1. A cryogenic refrigerator for producing temperatures within a given low temperature range, said refrigerator including a single-stage cold head and a regenerator operatively connected to said cold head, said regenerator having at least two layers of different materials through which a working fluid is circulated, said materials being selected so that the cold head has an optimum refrigerating capacity between 15K and 80K, wherein said regenerator contains a first layer of bronze mesh material on the warm side of the regenerator and a second layer of lead material on the cold side of the regenerator.

2. The refrigerator of claim 1 wherein said regenerator has three layers of differing materials that include a first layer of bronze mesh located on the warm side of the regenerator extending along about two to three sevenths of the regenerators total length, a second layer adjacent the first layer of bronze mesh having a mesh size that is smaller than that of said first layer extending along about two to three sevenths of the regenerators total length and a third layer of lead spheres or sintered lead material extending along about one to two sevenths of the regenerators total length.

3. The refrigerator of claims 1 wherein said regenerator has three layers of differing materials for providing an optimum refrigerating capacity within a temperature range of between 15 and 35 K, said layers including:

a first layer on the warm side of the regenerator that includes a 200 mesh copper-bronze material extending along about 40% of the regenerators total length;

a second layer adjacent the first layer that includes a 120 mesh copper-bronze material extending along about 40% of the regenerators total length; and a third layer adjacent the second layer that includes lead spheres having a diameter of about between 200 to 300 $\mu$m and extending along about 20% of the regenerators total length.

4. The refrigerator of claim 1 wherein said regenerator has three layers of differing materials for providing an optimum refrigerating capacity within a temperature range of between 35 to 80 K, said layers including:

a first layer on the warm side of the regenerator that includes a 200 mesh copper-bronze material extending along about 40% of the regenerators total length;

a second layer adjacent said first layer that includes a 120 mesh copper-bronze material extending along about 40% of the regenerators total length, and a third layer adjacent said second layer that includes 80 to 200 mesh copper-bronze material that extends along about 20% of the regenerators total length.

5. The refrigerator of claim 4 wherein said first layer is replaced with a layer of 100 to 200 mesh stainless steel material.

6. A process for optimizing the capacity of a cryogenic refrigerator within a given temperature range that includes the steps of:

providing a regenerator which is operatively associated with a single-stage cold head:

creating adjacent layers of different material within said regenerator so that a working fluid flows in series through the layers from a warm side of the regenerator toward a cold side of the regenerator; and selecting the material in each adjacent layer to provide the refrigerator with an optimum capacity between 15 K and 80 K providing a first layer of about 200 mesh copper-bronze material adjacent the warm side of the regenerator, a second layer of about 120 mesh copper-bronze material adjacent the first layer, and a third layer of lead spheres adjacent the second layer and sizing the length of the third layer so that it is about one half of the length of the first and second layers.

7. The process of claim 6 that includes the further step of providing three adjacent layers of copper-bronze mesh within the regenerator with the first layer being positioned adjacent the warm side of the regenerator and having a 200 mesh size, positioning a second layer adjacent the first layer having a 100 mesh size and positioning a third layer adjacent the second layer having a 80 to 200 mesh size, and sizing the length of the third layer so that it is about one half the length of the first and second layers.

8. The process of claim 7 that includes the further step of replacing the first layer of material with an 100 to 200 mesh of stainless steel.

9. The process of claim 6 that includes the further step of cooling a magnet or a coil made of a superocnducting material with said cold head.

10. The process of claim 9 that includes the further step of providing a closed loop helium cooling circuit with a coiled tube surrounding the magnet or coil and placing a heat exchanger between the cooling circuit and the cold head of refrigerator.

11. The process of claim 9 that further includes the step of linking the cold head to the magnet or coil by copper strips.

12. The process of claim 9 that includes the further step of placing the magnet or coil in a bath of helium.

13. The process of claim 9 that includes the further step of providing a thermal shield about the magnet or coil and cooling the shield with a second cold head that is optimized to the desired shield temperature.

14. The process of claim 6 that includes the further step of providing a cryogenic pump having a pumping surface, cooling the pumping surface with said cold head, and selecting the regenerator layer material to optimize the cold head temperature within the desired temperature range of the pumping surface.

15. The process of claim 14 wherein the cold head temperature is in a range of 10 to 30K.

16. The process of claim 15 including the further step of thermally linking the cold head to an open pumping surface.

17. The process of claim 15 that includes the further steps of thermally linking a single-stage cold head to the cryogenic pump and placing an inlet baffle and a thermal shield about the pumping surface and cooling the baffle and the thermal shield with a second single-stage cold head.

* * * * *